United States Patent
Platt et al.

(10) Patent No.: US 9,221,361 B1
(45) Date of Patent: Dec. 29, 2015

(54) SPRING ASSISTED ENERGY ATTENUATING SEATING SYSTEM

(71) Applicant: Armorworks Enterprises LLC, Chandler, AZ (US)

(72) Inventors: Joshua Platt, Concord, CA (US); Loren K. Aragon, Maricopa, AZ (US)

(73) Assignee: Armorworks Enterprises LLC, Chandler, AZ (US)

( * ) Notice: Subject to any disclaimer, the term of this patent is extended or adjusted under 35 U.S.C. 154(b) by 0 days.

(21) Appl. No.: 14/510,922

(22) Filed: Oct. 9, 2014

Related U.S. Application Data

(60) Provisional application No. 61/909,481, filed on Nov. 27, 2013.

(51) Int. Cl.
- *B60N 2/42* (2006.01)
- *B60N 2/16* (2006.01)
- *B60N 2/427* (2006.01)

(52) U.S. Cl.
CPC ............. *B60N 2/163* (2013.01); *B60N 2/1635* (2013.01); *B60N 2/1685* (2013.01); *B60N 2/4242* (2013.01); *B60N 2/42736* (2013.01)

(58) Field of Classification Search
CPC .. B60N 2/4242; B60N 2/42736; B60N 2/163; B60N 2/1635; B60N 2/1685
USPC ........................ 297/344.18, 216.17; 296/68.1
See application file for complete search history.

(56) References Cited

U.S. PATENT DOCUMENTS

| | | | | |
|---|---|---|---|---|
| 1,952,872 | A * | 3/1934 | Kersten | 297/174 R |
| 2,937,692 | A * | 5/1960 | McMichael, Jr. | 248/244 |
| 3,625,563 | A * | 12/1971 | Dickinson et al. | 297/333 |
| 4,186,963 | A * | 2/1980 | Koutsky | 297/308 |
| 4,387,876 | A | 6/1983 | Nathan | |
| 4,553,726 | A | 11/1985 | Jackson | |
| 7,413,247 | B2 * | 8/2008 | Van Druff et al. | 297/216.17 |
| 7,938,485 | B1 * | 5/2011 | Perciballi et al. | 297/216.1 |
| 8,550,553 | B1 * | 10/2013 | Clark et al. | 297/216.17 |
| 2010/0207433 | A1 * | 8/2010 | Hahn | 297/216.1 |
| 2011/0079681 | A1 * | 4/2011 | Honnorat | 244/122 R |
| 2013/0214570 | A1 * | 8/2013 | Grant et al. | 297/216.1 |

FOREIGN PATENT DOCUMENTS

EP       1780072 A2 *  5/2007  ............ B60N 2/163

* cited by examiner

*Primary Examiner* — Milton Nelson, Jr.
(74) *Attorney, Agent, or Firm* — James L. Farmer

(57) ABSTRACT

Methods and apparatus are provided for a spring assisted energy attenuating seating system. In one embodiment the seating system includes a seat mounted for guided, sliding vertical movement up and down a stationary vertically oriented column inside the vehicle, and a locking mechanism for releasably locking the seat to the column at a plurality of vertical positions. The system may further include a lift spring connected between the seat and support column configured to apply a constant upward force to the seat.

19 Claims, 7 Drawing Sheets

SPRING ASSISTED ENERGY ATTENUATING SEATING SYSTEM

TECHNICAL FIELD AND BACKGROUND

The field of the present disclosure relates generally to vehicle seating systems, including seating systems with energy attenuating ("EA") devices for absorbing or attenuating high energy shock loads. The field may further relate to specially adapted seats and seating systems, such as for example crew seats and gunner seats designed for use in tactical military vehicles. This application claims the benefit of U.S. Provisional Application No. 61/909,481 filed on Nov. 27, 2013, the entire contents of which are hereby incorporated by reference.

DESCRIPTION OF THE EMBODIMENTS

Figure 1:
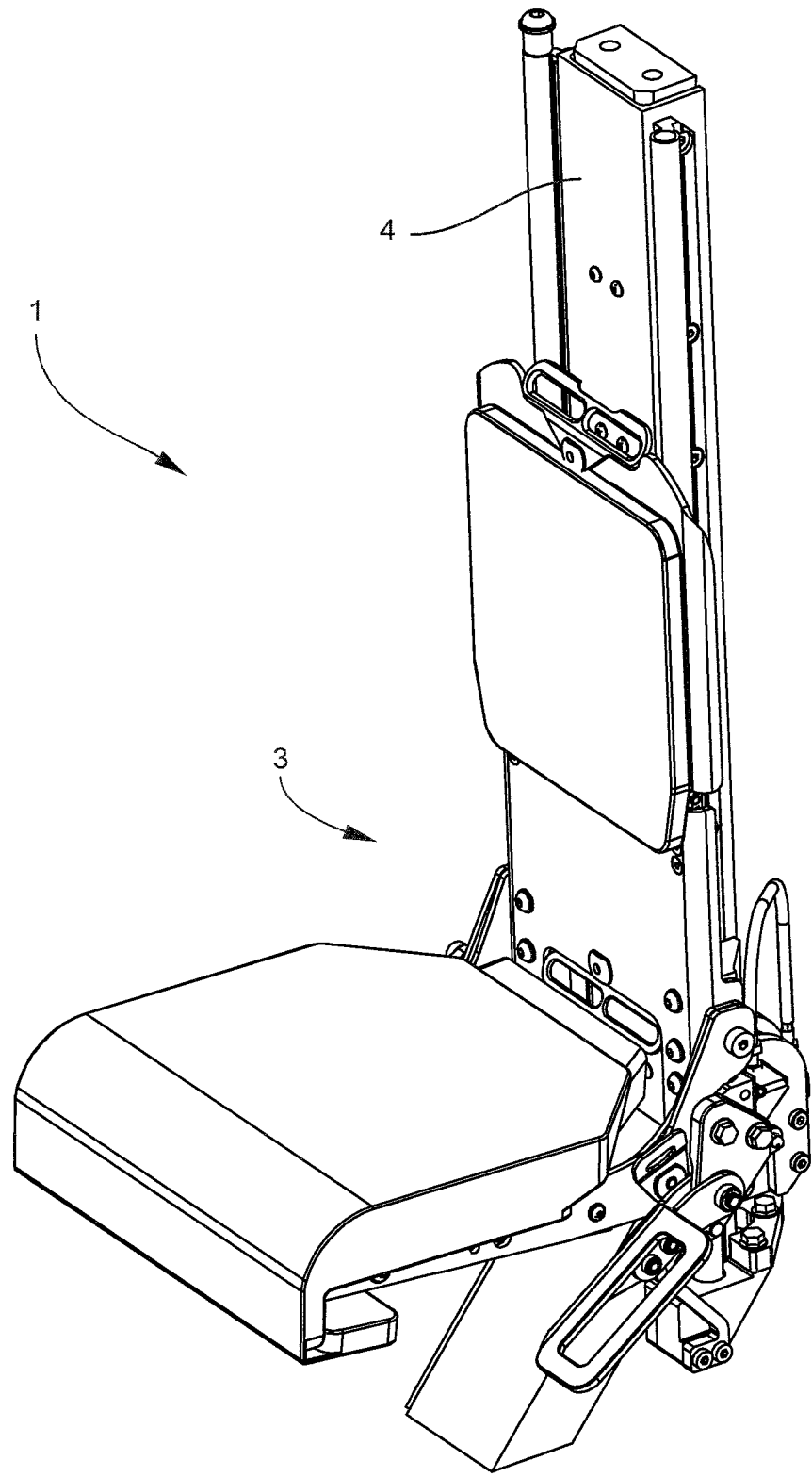
FIG. 1 is a perspective front view of a spring assisted energy attenuating seating system in accordance with the present disclosure.
Figure 2:
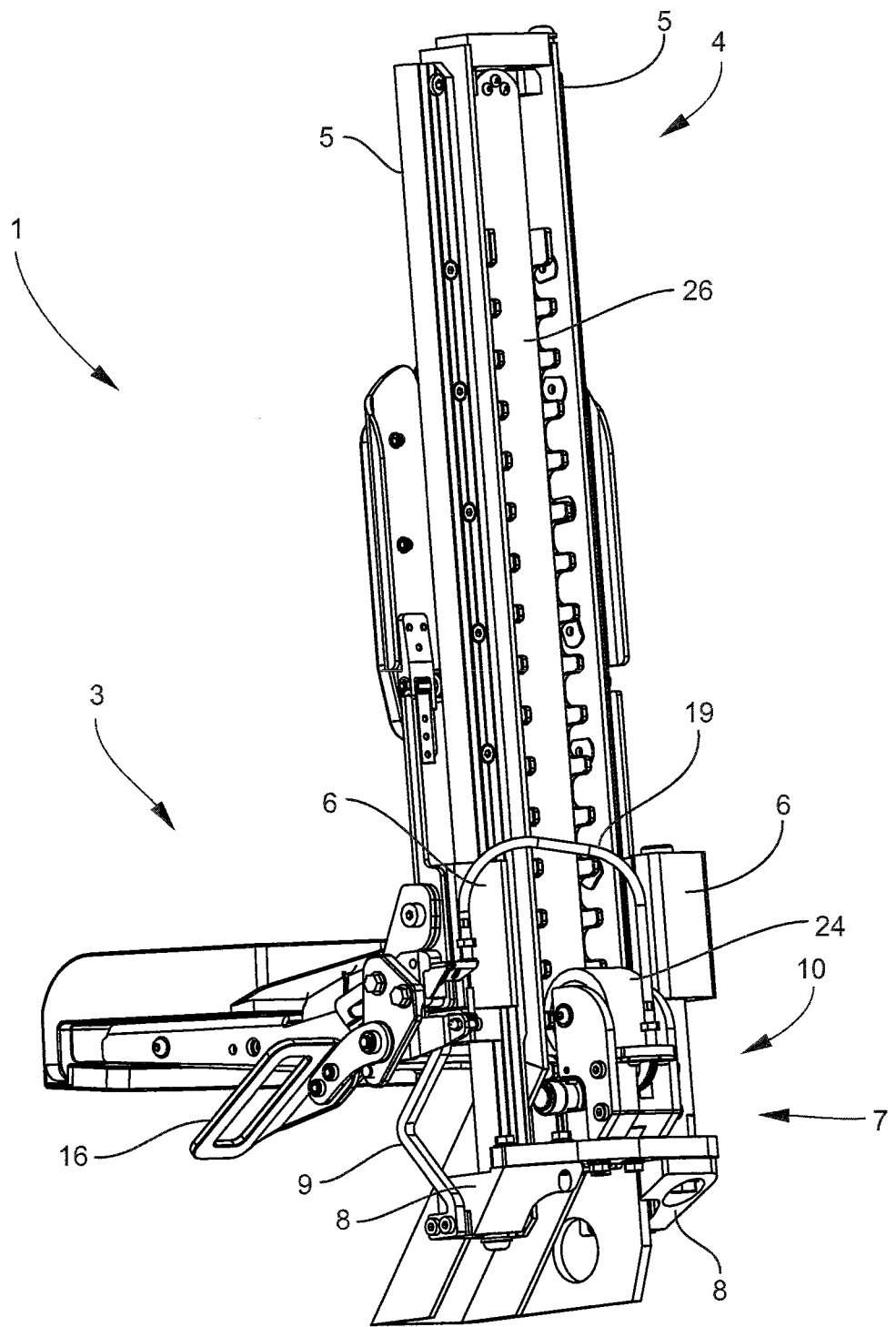
FIG. 2 is a perspective back view of the seating system of FIG. 1.
Figure 3:
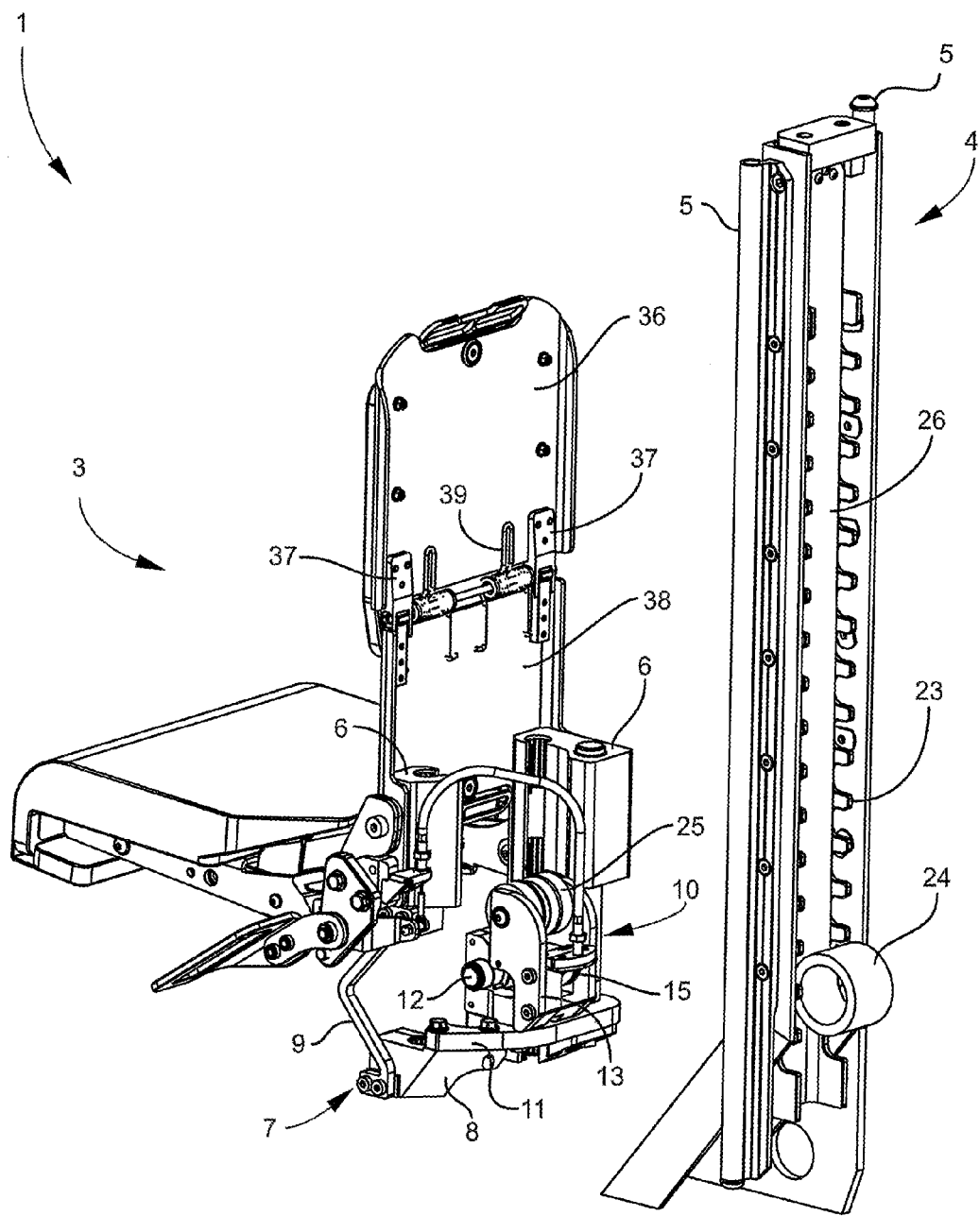
FIG. 3 is a back perspective, partially exploded view of the seating system of FIG. 1, showing the support column separated from the seat.
Figure 4:
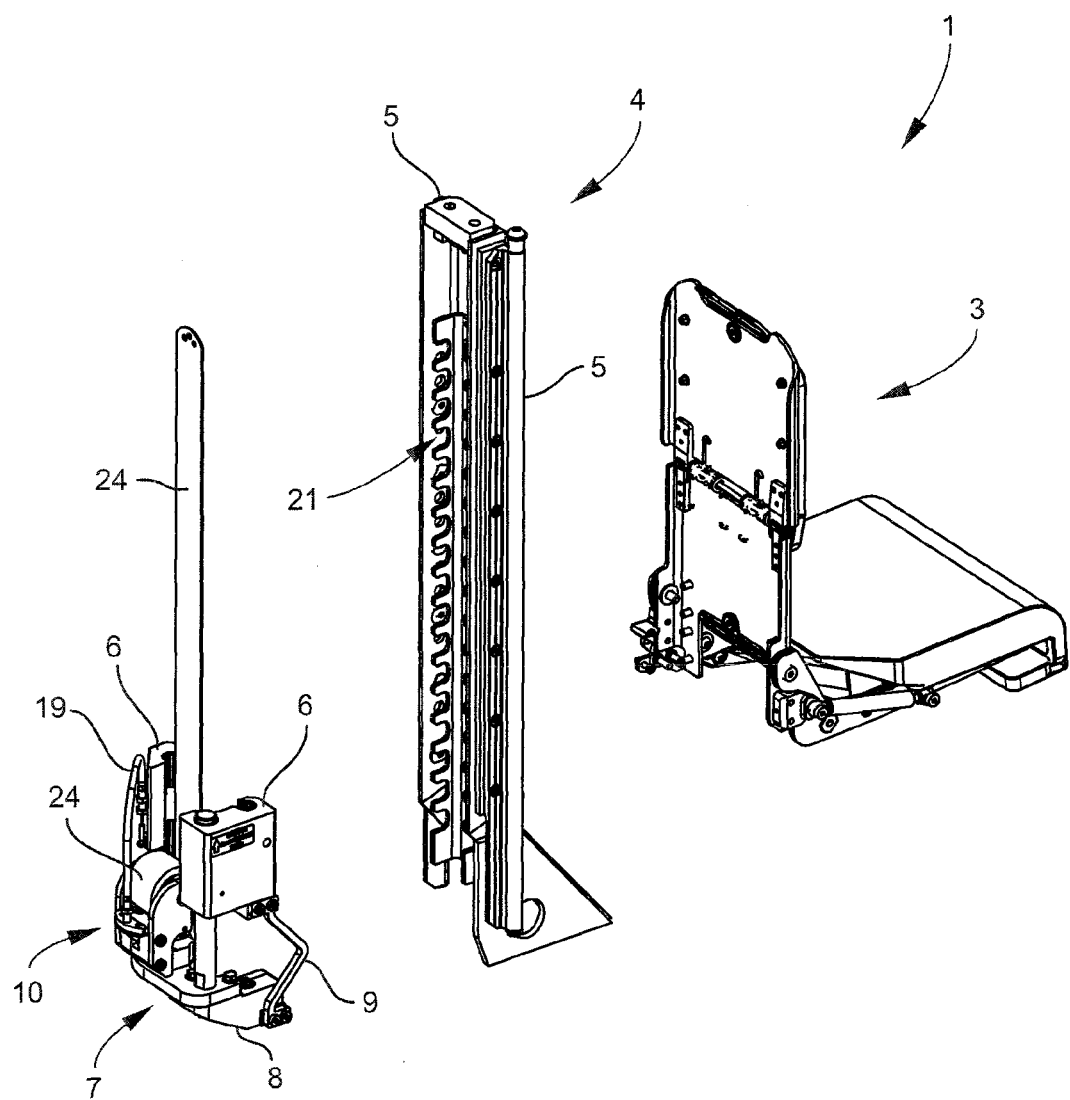
FIG. 4 is another back perspective, partially exploded view of the seating system of FIG. 1.

The instant invention is described more fully hereinafter with reference to the accompanying drawings and/or photographs, in which one or more exemplary embodiments of the invention are shown. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list. Terms such as "connected" or "attached" as used herein are intended to denote direct, indirect (with intermediate elements), rigid, and flexible linking arrangements, as well as linking arrangements with one or more degrees of freedom. The term "vehicle" as used herein is intended to mean any person carrying structure, including but not limited to all types of land vehicles, aircraft, watercraft, rockets, spacecraft, and the like. As used herein, the term "aircraft" is intended to denote any airborne vehicle including but not limited to airplanes, jets, gliders, helicopters, and lighter-than-air craft.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Referring now to the drawing figures, an exemplary variable height energy attenuating ("EA") seating system in accordance with the present disclosure is indicated generally at reference numeral 1. EA seats are typically employed to mitigate the severe shock loads associated with under vehicle mine blasts, helicopter crashes, or other impact type events involving sudden relative acceleration between the seat and the structure supporting the seat. Many EA seats utilize some form of crushable member between the seat and the supportive structure to absorb the energy of the event. The EA mechanism is typically oriented to stroke in the direction of the anticipated shock load, such as toward the floor of a vehicle or aircraft, although additional EA supports may be included to account for shock loads from more than one direction. EA seats are disclosed for example in issued U.S. Pat. Nos. 7,938,485, 8,403,410, and 8,678,465, all of which are assigned to the assignee of the instant invention, and all hereby incorporated by reference.

Referring initially to FIGS. 1 through 4, an energy attenuating seating system 1 comprises a seat 3 rapidly movable to a plurality of positions along a substantially vertical structure or surface within a vehicle. The structure or surface is tall enough to provide for a relatively large range of vertical seat positions. For example, the seat may be moveable from a normal seating height with the occupant's feet on the vehicle floor, to a position well above the floor in which a portion of the seat and occupant project through an opening in the roof of the vehicle. In one such embodiment the seat is installed at a gunner station of a tactical fighting vehicle, and seat is vertically moveable into a gun turret on the vehicle roof.

The substantially vertical structure or surface may for example be a seat support column 4, with fittings at one or both ends for rigidly attaching the column to the vehicle interior structure or frame. The seat 3 is mounted for guided, sliding vertical movement up and down on the support column 4, such as via one or more upper slide members 6 attached to the seat. The upper slide members 6 may comprise left and right cylindrical bushings attached to a back side of the seat, as shown, that slide along round guide bars 5 disposed along opposing sides of column 4.

The seat may be prevented from sliding freely by a seat locking assembly 7 that is lockable to the column 4 at a range of vertical positions. The seat locking assembly 7 may include lower slide members 8, also movably connected to guide bars 5, but substantially below and spaced apart from the upper slide members 6; and a latch 10 connected to lower slide members 8. The seat locking assembly 7 is connected to the seat 3 by one or more rigid EA links 9. In the depicted embodiment the EA link comprises a metal bar with straight sections and a bend in the middle, producing a "V" shape. However other shapes of EA links, or types of energy absorbing members may utilized instead, such as for example a crush tube, inversion tube, wire bender, or the EA links disclosed in the above noted patents and patent applications. The upper and lower ends of the depicted EA link 9 are attached to the upper and lower slide members 6, 8, respectively. The end attachments may be moment constrained, such as with the two bolt arrangement shown, to prevent rotation of the links at the mounting points.

Figure 5:
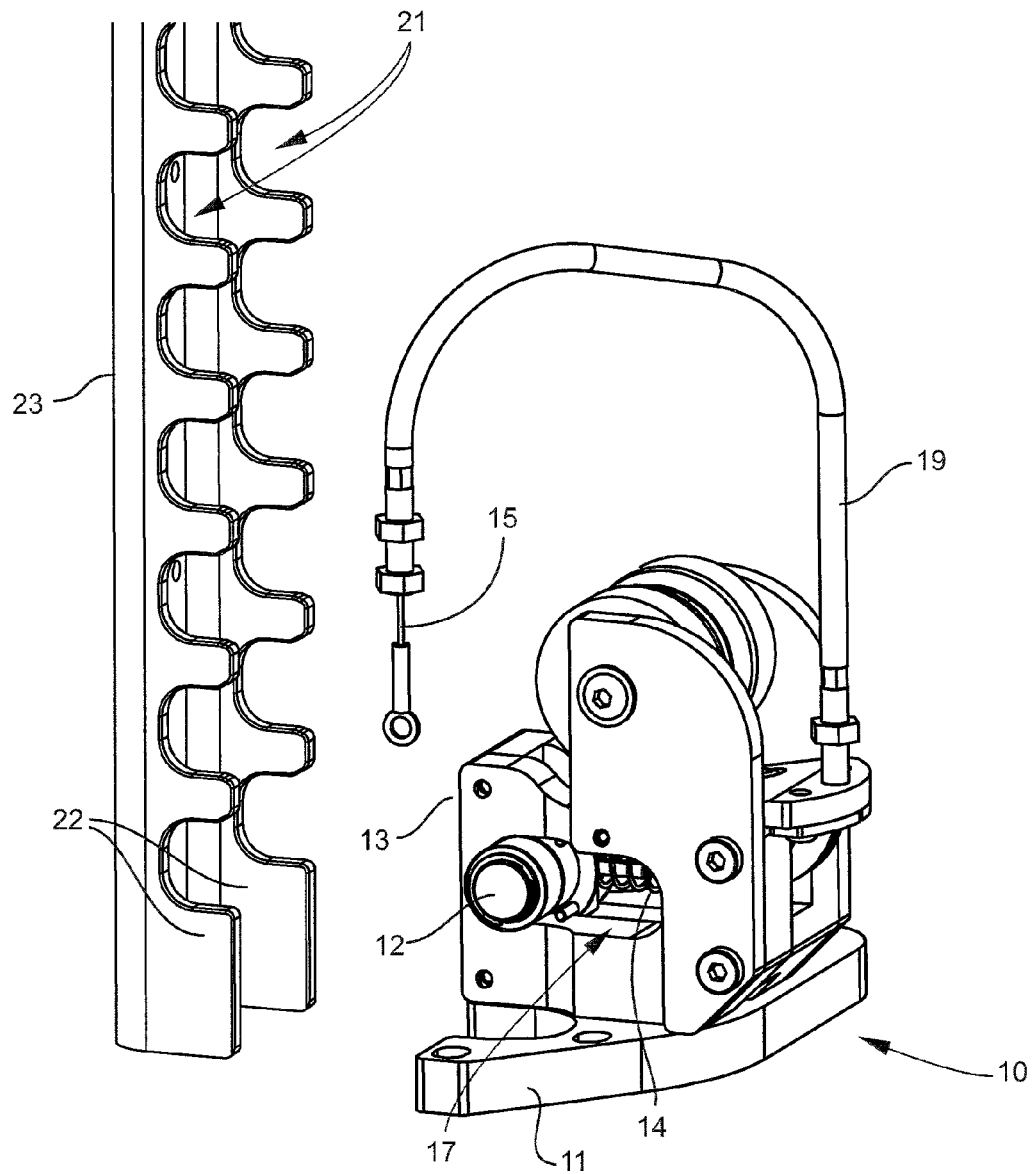
FIG. 5 is a close-up perspective of the seat locking mechanism.
Figure 6:
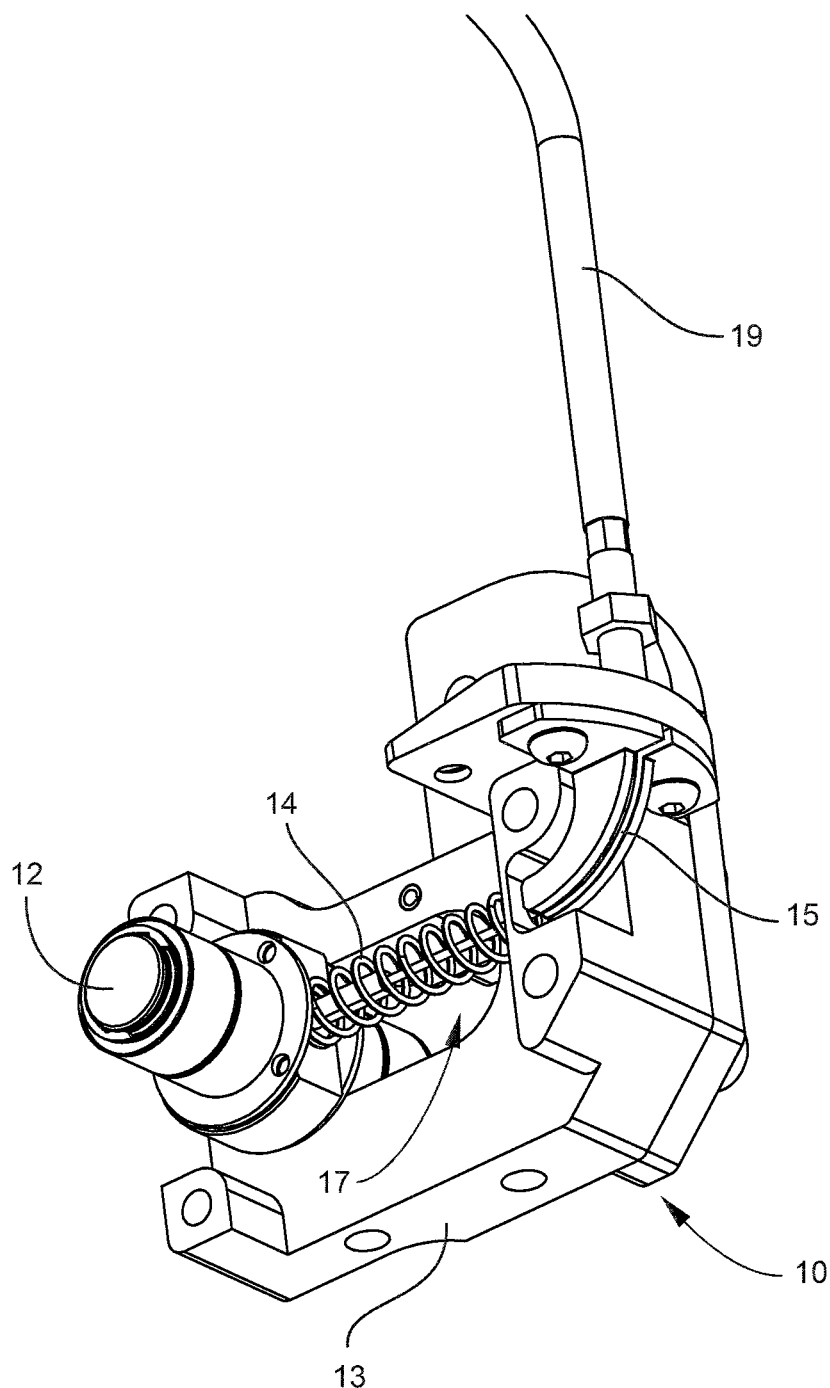
FIG. 6 is a partial cut-away view of the locking mechanism shown in FIG. 5.

Referring now also to FIGS. 5 and 6, the latch 10 is a manually operated, spring loaded locking member designed to work in conjunction with a series of evenly spaced holes or slot-like features disposed vertically along the column for adjusting the vertical seat position. For example, in the depicted embodiment the locking member comprises a latch bar 12 that is slidably mounted in a housing 13 on the seat locking assembly 7 within a pair of parallel slots 17 in the sides of the housing. The housing 13 is attached to lower slide members 8 such as by base plate 11, and positioned immediately behind column 4, placing column 4 between the housing 13 and the back of seat 3 (see FIG. 2). A compression spring 14 located inside the housing 13 parallel to and between slots 17 biases the latch bar in a forward direction, toward column 4. A first end of an unlatch cable 15 is attached to the latch bar and extends rearward through spring 14, and a second end of the cable connects to a seat height adjustment lever 16 (see FIG. 1). Cable 15 may slide inside a fixed cable housing 19 as shown. Adjustment lever 16 is configured such when the lever is manually deflected, the second end of the cable 15 is pulled, causing the first end of the cable to pull the latch bar 12 rearward in slots 17. The force applied to lever 16 must be enough to overcome the resisting force of spring 14. Upon releasing lever 16 the spring 14 will push the latch bar forward in slots 17 toward column 4.

The back surface of column 4 comprises a series of evenly spaced horizontal grooves or slots 21 for receiving latch bar 12. As shown, the slots 21 may be cut-outs in the side walls 22 of an open channel 23 attached to the back side of column 4. The slots are positioned relative to housing 13 and latch bar 12 such that when the latch bar 12 is vertically aligned with a pair of slots, it can be moved in and out of the slots by operating lever 16. More specifically, when the lever 16 is not being operated, the spring 14 pushes the latch bar forward into the slots 21, thereby vertically locking the housing 13 and seat locking assembly 7 to column 4. Because the seat is attached to the seat locking assembly 7 by EA links 9, locking the seat locking assembly to the support column also locks the seat to the column. Conversely by again manually deflecting lever 16, the latch bar 12 is retracted from the slots 21 far enough to completely clear the slotted back edge of channel 23, releasing the seat locking assembly 7 and seat 3 along with it. With the latch bar retracted, the seat and seat locking assembly are thus free to slide as a unit along guide bars 5 as long as the lever 16 remains deflected.

Figure 7:
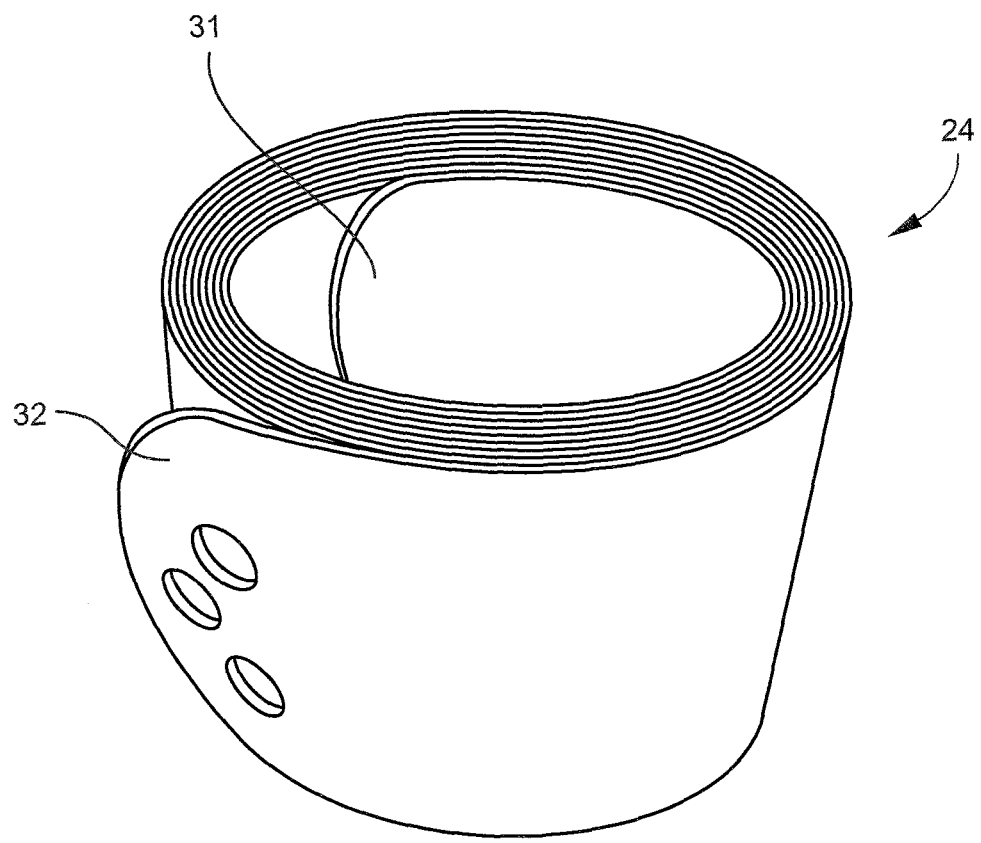
FIG. 7 is an exemplary lift spring made of flat strip metal.

Referring also now to FIG. 7, the seating system may further include a lift spring to counteract the weight of the seat and a seated occupant. The lift spring may be any type of spring operatively connected to the seat and to an upper portion of column 4, and configured to push or pull the seat upward. In the embodiment shown, a lift spring 24 comprises a concentrically wound coil of strip metal, similar in that respect to a clock spring, with a first end 31 on the inside of the spring, and a second, free end 32 on the outside. The spring 24 is disposed about a horizontal axle 25 (see FIG. 3) mounted in the seat locking assembly 7. Axle 25 may be located above latch bar 12 as shown, and either attached to or built into an upper portion of housing 13. The free end 32 of spring 24 is attached to an upper portion of column 4, requiring that at least some amount of the spring be unwound from the coil even when the seat is in it's highest possible vertical position on the column. The spring may be sized to fit between the sides of channel 23, and positioned such that the spring unwinds from a side of the coil adjacent the column, and the unwound portion 26 lays flat against the base of the channel as shown.

Unlike a clock spring however, the coil spring 24 is biased to wind back up on itself instead of tending to unwind, and when unloaded will wind up on itself until all of the coils are packed tightly together. Thus when installed as described above, the coiled portion of spring 24 around axle 25 tries to wind back up on itself toward the top of the column where the free end of the spring is restrained. This re-winding tendency is resisted by the axle 25, resulting in an upward force being applied to the seat locking assembly and the seat.

The re-winding force of the spring coil is determined primarily by the physical dimensions of spring 24, such as thickness, width, inside diameter, and outside diameter, and when properly configured is also generally independent of the amount of spring that has been unwound. For example, the spring may be configured with at least a minimum acceptable number of coils and at least a minimum wound inside diameter to achieve a desired uniformity in the re-winding force. Thus spring 24 may be configured to apply a substantially uniform and continuous upward load on seat 3, regardless of how much spring has been unwound or where in particular the seat is vertically positioned along the column. One example of a suitable constant force lift spring is given in Table 1 below made from two laminations of spring steel strip metal wound into a single spring.

TABLE 1

| Exemplary constant force lift spring specifications | |
| --- | --- |
| Material: | spring steel |
| Thickness: | 0.07 in. (total 2 strips in laminar configuration) |
| Width: | 2.0 in. |
| Inside diameter: | 2.11 in. |
| Outside diameter: | 2.90 in. |
| Lead off: | 3.25 in. (unloaded, from outside diameter end) |
| Number of winds: | 5 (approx.) |
| Force: | 95 lbs. +/− 10% |
| Travel length: | 28 in. (center of spring) |

The spring may be further configured to provide a lifting force that equals or exceeds the weight of the seat assembly. For example, in one embodiment the spring lifting force is large enough to cause the seat to move unassisted up the column when the latch bar 12 is released. In that case a seat occupant may conveniently stop or reverse the upward motion by simply modulating the amount of the occupant's body weight that is being supported by the seat. Then once the seat is in a desired position, the occupant may lock the seat in place by simply releasing the adjustment lever 16.

Alternatively the spring may be configured to provide a lifting force that equals or even exceeds the combined weight of the seat and a typical occupant, allowing a seated occupant to move up and down the column with little or no external force applied. In the case of the lifting force exceeding the combined weight of the seat and occupant, the seat may even be used in the manner of an elevator to automatically and quickly lift a seated occupant to a raised position by simply releasing the latch bar 12.

The ability to quickly and easily elevate a seated occupant may be particularly useful in certain installations, such as for example providing quick access to a roof mounted gun turret in a military vehicle. Vehicle gun turrets are typically unoccupied except when it is necessary to operate the turret gun, in which case the gunner must climb up into the gun turret and into a firing position. This may require the gunner to first un-belt and disembark from a seat inside the vehicle, perhaps while the vehicle is moving.

Advantageously however, a properly configured spring assisted seat of the present invention allows the gunner to move quickly from a seated and secured position inside the vehicle to a firing position in a roof mounted gun turret, without ever getting out of the seat or having to climb unrestrained into the turret of a moving vehicle. In particular, with the seat initially positioned near the bottom of the column such that the seated and secured occupant is inside the vehicle at a normal seating distance from the floor, the occupant may operate lever 16 allowing the seat and occupant to begin moving up the column and into the gun turret. Depending on the spring force, the upward movement may or may not require the use of additional lifting force by the occupant. The occupant may continue to hold lever 16 until the the seat reaches the top of the column, and then release the lever. A top stop 35 at the top of at least one of bars 5 limits the upward travel of the upper slide members 6, defining a maximum seat height. Alternatively the occupant may release lever 16 sooner to lock the seat at some desired vertical position in the turret before the seat reaches the top of the column. In either case the gunner may move from inside the seating compartment up into the gun turret without the requirement of getting out of the seat or disconnecting a harness or belt restraints.

Referring again to FIG. 3, the seat 3 may further comprise a reclining upper seat back 36 that is attached by hinges 37 to a lower seat back 38. The upper seat back may be tilted back when the seat is positioned high enough on the column so that the upper end of the column does not interfere as the seat tilts. One or more hinge springs 39 bias the upper seat back 36 toward the normal upright position shown. Thus a seated occupant can tilt the seat back as much as needed by simply leaning back with enough force to overcome the spring bias. Reclining the upper seat back in this manner may be advantageously used to allow an occupant, or in particular a gunner, to move about more freely when positioned substantially above or outside of a turret opening.

As mentioned previously, with the seat locked in position to column 4, the combined weight of the seat and a seated occupant is carried by the EA links 9. If the force applied to the EA links by the occupied seat exceeds a pre-defined threshold value, such as in the event of an under-vehicle explosion or an aircraft slam-down, the EA links will begin to buckle. As the EA links begin to buckle, the seat will begin to slide down column 4, closing the gap between the sliding upper slide members 6 and fixed lower slide members 8. The seat will continue to stroke downward relative to the vehicle as the EA links continue to collapse and absorb energy, stopping when the links have absorbed all of the event energy, or when the upper slide members 6 bottom out against the lower slide members 8.

The exemplary EA links 9 are designed to substantially absorb an anticipated range of impact energies, and may be custom tunable by modifying their material type, thickness, and/or shape. In one exemplary implementation, the present seat mount system may attenuate an impact of a 6.5 meters-per-second pulse, such as may result from an under-vehicle mine or IED explosion. The exemplary system may also be capable of withstanding the following road shock loads transmitted through the vehicle chassis structure: 10 G's vertical, 8 G's longitudinal, and 5 G's transverse. In other exemplary embodiments, the seating assembly 1 may incorporate other or additional known energy attenuation links or devices. Although the EA links 9 may protect the occupant for multiple impact events, they are generally considered disposable and easily replaced to restore a maximum level of protection to the seating system.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

What is claimed is:

1. A height adjustable vehicle seating system, comprising:
 a seat mounted via an upper slide member for guided, sliding vertical movement on a stationary, vertically oriented support column;
 a seat locking assembly rigidly connected to the seat by at least one deformable energy attenuating link, the seat locking assembly lockable to the support column at a range of vertical positions; and
 a lift spring connected between the seat and the support column, the lift spring configured to apply an upward force to the seat of sufficient magnitude to assist upward movement of the seat along the column, wherein the magnitude of the lifting force is substantially constant for any vertical position of the seat.

2. The vehicle seating system of claim 1, wherein the deformable energy attenuating link comprises a metal bar having at least two straight sections and a bend between the straight sections.

3. The vehicle seating system of claim 1, wherein the support column is positioned immediately behind the seat.

4. The vehicle seating system of claim 3, wherein the upper slide member comprises elongated cylindrical bushings configured to slide on a pair of round guide bars disposed on opposite sides of the column.

5. The vehicle seating system of claim 1, wherein the lift spring is a concentrically wound coil of flat strip metal with a first end at an inner diameter of the coil and a second end at an outer diameter of the coil, the spring configured such that it tends to wind up on itself until the coils are packed tightly together, and resist unwinding of the second end from the coil.

6. The vehicle seating system of claim 5, wherein the second end of the spring is attached to an upper portion of the column, and the coil is disposed about an axle on the seat locking assembly, and wherein the second end of the spring unrolls from a side of the coil adjacent the column when the seat is caused to move downward along the column, such that an unrolled portion of the spring lays against the column, and an upward load is applied to the axle by the coil.

7. The vehicle seating system of claim 6, wherein the upward load applied to the axle by the lift spring is at least equal to the weight of the seat.

8. The vehicle seating system of claim 6, wherein the spring unrolls into an open channel on a side of the support column facing the lift spring, the channel having a substantially flat base and two parallel sides with longitudinal edges, wherein the unrolled portion of the spring lays against the base of the channel, between the two parallel sides.

9. The vehicle seating system of claim 8, further comprising:
    a series of evenly spaced aligned pairs of horizontal slots formed in the two sides of the channel, the slots extending inward from the longitudinal edges of the sides toward the base of the channel;
    a latch bar moveably mounted to the seat locking assembly, the latch bar oriented parallel to the base of the channel and moveable in a horizontal direction into and out of the aligned pairs of slots in the channel; and
    a cable connected at one end to the latch bar and at the other end to an unlatch lever, wherein the unlatch lever is operable to pull the cable and retract the latch bar clear of the slots, thereby unlocking the seat from the support column.

10. The vehicle seating system of claim 9, further comprising a latch spring configured to push the latch bar toward the base of the channel and into the pairs of aligned slots when the unlatch lever is released, thereby locking the seat to the support column.

11. A height adjustable vehicle seating system, comprising:
    a stationary, vertically oriented support column with a pair of elongated guide bars disposed on opposite sides thereof, the guide bars extending substantially the entire vertical height of the column;
    a seat mounted for guided, sliding vertical movement on the guide bars by an upper slide member;
    a seat locking assembly rigidly connected to the seat by at least one deformable energy attenuating link, the seat locking assembly lockable to the support column at a range of vertical positions; and
    a lift spring disposed between the seat and the support column, the lift spring configured to apply a constant upward force to the seat.

12. The vehicle seating system of claim 11, wherein the lift spring is a concentrically wound coil of flat strip metal with a first end at an inner diameter of the coil and a second end at an outer diameter of the coil, the spring configured such that it tends to wind up on itself until the coils are packed tightly together.

13. The vehicle seating system of claim 12, wherein the second end of the spring is attached to an upper portion of the column, and the coil is disposed about an axle on the seat locking assembly, and wherein the second end of the spring unrolls from a side of the coil adjacent the column when the seat is caused to move downward along the column, such that an unrolled portion of the spring lays against the column, and an upward load is applied to the axle by the coil.

14. The vehicle seating system of claim 13, wherein the spring unrolls into an open channel on a side of the support column facing the lift spring, the channel having a substantially flat base and two parallel sides with longitudinal edges, wherein the unrolled portion of the spring lays against the base, between the two sides.

15. The vehicle seating system of claim 14, further comprising:
    a series of evenly spaced aligned pairs of horizontal slots formed in the two sides of the channel, the slots extending inward from the longitudinal edges of the sides toward the base of the channel;
    a latch bar on the seat locking assembly, moveable in a horizontal direction into and out of the aligned pairs of slots in the channel; and
    a cable connected at one end to the latch bar and at the other end to an unlatch lever operable to pull the cable and retract the latch bar clear of the slots, thereby unlocking the seat from the support column.

16. The vehicle seating system of claim 15, further comprising a latch spring configured to push the latch bar toward the base of the channel and into the aligned pairs of slots.

17. A height adjustable vehicle seating system, comprising:
    a stationary vertically oriented column;
    a seat mounted for guided, sliding vertical movement up and down the column;
    a latch for releasably locking the seat to the column at a plurality of vertical positions, the latch rigidly connected to the seat by at least one energy attenuating link;
    a lift spring comprising a concentrically wound coil with a first end at an inner diameter of the coil and a second end at an outer diameter of the coil, the spring biased to wind up on itself when unloaded, wherein:
    the second end of the spring is connected to an upper portion of the column;
    the wound coil is disposed about an axle connected to the seat; and
    the second end of the spring unrolls from a side of the coil adjacent the column when the seat is caused to move downward along the column such that an unrolled portion of the spring lays against the column, and an upward load is applied to the seat by the wound coil.

18. The vehicle seating system of claim 17, wherein the seat is mounted on the support column via a pair of upper slide members attached to a back side of the seat, each slide member movably connected to one of a pair of guide bars disposed on opposite sides of the support column, and wherein the latch is mounted for vertical movement on the support column by a pair of lower slide members movably connected to the guide bars, the lower slide members positioned below and spaced apart from the upper slide members.

19. The vehicle seating system of claim 17, wherein the spring is made of flat strip metal.

* * * * *